(12) United States Patent
Schwalm et al.

(10) Patent No.: US 7,576,143 B2
(45) Date of Patent: Aug. 18, 2009

(54) RADIATION-HARDENABLE COMPOUNDS

(75) Inventors: Reinhold Schwalm, Wachenheim (DE); Erich Beck, Ladenburg (DE); Klaus Menzel, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/817,831

(22) PCT Filed: Mar. 8, 2006

(86) PCT No.: PCT/EP2006/061088

§ 371 (c)(1),
(2), (4) Date: Sep. 5, 2007

(87) PCT Pub. No.: WO2006/103228

PCT Pub. Date: Oct. 5, 2006

(65) Prior Publication Data

US 2008/0194725 A1    Aug. 14, 2008

(30) Foreign Application Priority Data

Apr. 1, 2005    (DE) .................. 10 2005 015 309

(51) Int. Cl.
*C08F 2/46* (2006.01)
*C08G 18/00* (2006.01)
*C08G 18/77* (2006.01)

(52) U.S. Cl. .......................... 522/174; 522/90; 522/96; 522/93; 522/97; 522/150; 522/152; 522/151; 522/173; 522/178; 522/181; 522/182; 522/180; 528/44; 528/52; 528/53; 528/54; 528/59; 528/65; 528/75; 528/76; 528/83; 528/62

(58) Field of Classification Search .................. 522/84, 522/90, 96, 97, 93, 150, 152, 173, 174, 180, 522/181, 182; 528/44, 52, 53, 54, 59, 62, 528/65, 75, 76, 83
See application file for complete search history.

(56) References Cited

U.S. PATENT DOCUMENTS

| | | | |
|---|---|---|---|
| 4,870,152 A | 9/1989 | Meixner et al. | |
| 6,177,535 B1 | 1/2001 | Schwalm et al. | |
| 6,350,523 B1 * | 2/2002 | Schwalm | ................. 428/423.1 |
| 6,444,721 B2 * | 9/2002 | Schwalm et al. | ............. 522/84 |
| 6,458,459 B1 | 10/2002 | Schwalm et al. | |
| 6,521,702 B1 * | 2/2003 | Weikard et al. | ............. 524/839 |
| 2006/0079624 A1 * | 4/2006 | Nava et al. | ................. 524/492 |
| 2007/0066704 A1 | 3/2007 | Schwalm et al. | |

FOREIGN PATENT DOCUMENTS

| | | |
|---|---|---|
| CA | 2159265 | 3/1996 |
| DE | 103 46 327 A1 | 4/2005 |
| EP | 0 315 020 A2 | 5/1989 |
| EP | 0 704 469 A2 | 4/1996 |
| EP | 0 902 040 A1 | 3/1999 |
| EP | 0 903 363 A1 | 3/1999 |

\* cited by examiner

*Primary Examiner*—Sanza L McClendon
(74) *Attorney, Agent, or Firm*—Oblon, Spivak, McClelland, Maier & Neustadt, P.C.

(57) ABSTRACT

A polyurethane acrylate (A), comprises, as synthesis components, (a) at least one polyisocyanate which comprises isocyanurate groups, based on 1-isocyanato-3,5-trimethyl-5-(isocyanatomethyl)cyclohexane, (b) at least one polyisocyanate which comprises isocyanurate groups, based on hexamethylene diisocyanate, (c) at least one aliphatic and/or cycloaliphatic diisocyanate, (d1) at least one polyetherdiol or polyesterdiol having a molecular weight ranging from 500 to 2000, (d2) optionally, at least one diol having a molecular weight of less than 220 g/mol, (e) at least one compound having at least one group reactive toward isocyanate and at least one unsaturated group capable of free radical polymerization, and (f) optionally, at least one compound having exactly one group reactive toward isocyanate.

16 Claims, No Drawings

RADIATION-HARDENABLE COMPOUNDS

DESCRIPTION OF THE BACKGROUND

1. Field of the Invention

The invention relates to radiation-curable compounds, to processes for preparing them, to their use, and to coating materials comprising them.

2. Background of the Invention

EP-A 902 040 describes radiation-curable urethane acrylates based on aliphatic isocyanurates and biurets.

EP-A 903 363 describes radiation-curable urethane acrylates based on isocyanurates or biurets, if appropriate in a mixture, and on a monomeric cycloaliphatic isocyanate. Hydroxy-functional compounds disclosed are merely general lists of ethylenically unsaturated compounds having at least one reactive OH group and, optionally, different compounds comprising OH groups.

A disadvantage of the two last-mentioned disclosures is that the coating materials comprising such polyurethane acrylates form coatings which though hard and scratch-resistant are brittle.

The German patent application DE 10346327 A1 discloses radiation-curable urethane acrylates based on isocyanurates or biurets, if appropriate in a mixture, and on ethylenically unsaturated hydroxy compounds in merely general lists, and also polytetrahydrofuran as dihydroxy compounds.

A disadvantage of that document is that the coating materials comprising such polyurethane acrylates lead to coatings which though flexible lack scratch resistance.

It was an object of the present invention to provide further radiation-curable compounds which are to be curable by means of electromagnetic radiation, preferably UV radiation and in particular UV-A radiation. The coating materials obtained ought to exhibit low viscosity, high hardness and scratch resistances in conjunction with good flexibility, and a high reactivity on irradiation.

SUMMARY OF THE INVENTION

This object has been achieved by means of polyurethane acrylates (A) comprising as synthesis components
(a) at least one polyisocyanate which comprises isocyanurate groups, based on 1-isocyanato-3,3,5-trimethyl-5-(isocyanatomethyl)cyclohexane(isophorone diisocyanate),
(b) at least one polyisocyanate which comprises isocyanurate groups, based on hexamethylene diisocyanate(1,6-diisocyanatohexane),
(c) at least one aliphatic and/or cycloaliphatic diisocyanate,
(d1) at least one polyetherdiol or polyesterdiol having a molar weight of from 500 to 2000,
(d2) optionally, if appropriate, at least one diol having a molecular weight of less than 220 g/mol,
(e) at least one compound having at least one group reactive toward isocyanate and at least one unsaturated group capable of free radical polymerization, and
(f) if appropriate, at least one compound having exactly one group reactive toward isocyanate.

DESCRIPTION OF THE PREFERRED EMBODIMENTS

The polyurethane acrylates (A) according to the invention have as a rule a number-average molar weight $M_n$ of less than 20000 g/mol, preferably of less than 10000 g/mol, particularly preferably of less than 5000 and very particularly preferably of less than 3000 g/mol (determined by gel permeation chromatography using tetrahydrofuran and polystyrene as a standard).

The lower limit for the molar weight $M_n$ of the polyurethane acrylates according to the invention is generally 200 g/mol, preferably 500 g/mol and particularly preferably 1000 g/mol.

The polyurethane acrylates according to the invention contain virtually no free isocyanate groups at all, i.e. the amount of free isocyanate groups is less than 1% by weight, preferably less than 0.5, particularly preferably less than 0.3, very particularly preferably less than 0.2, in particular less than 0.1 and especially not more than 0.05% by weight.

Synthesis component (a) is at least one polyisocyanate which comprises isocyanurate groups, based on 1-isocyanato-3,3,5-trimethyl-5-(isocyanatomethyl)cyclohexane (isophorone diisocyanate).

Polyisocyanates of this kind containing isocyanurate groups may in addition to isophorone diisocyanate comprise further aromatic, aliphatic and/or cycloaliphatic diisocyanates. Particular preference is given here to the corresponding isocyanato isocyanurates, mixed starting from isophorone diisocyanate with aliphatic and/or other cycloaliphatic diisocyanates, and very particular preference to the isocyanato isocyanurates based on hexamethylene diisocyanate and isophorone diisocyanate. In particular the compounds (a) are pure polyisocyanates based on isophorone diisocyanate, in other words tris-isocyanatocycloalkyl isocyanurates, which constitute cyclic trimers of isophorone diisocyanate, or are mixtures with their higher homologs containing more than one isocyanurate ring. The isocyanato isocyanurates have in general an NCO content of from 10 to 30% by weight, in particular from 15 to 25% by weight, and an average NCO functionality of from 3 to 4.5.

Aromatic isocyanates are those which comprise at least one aromatic ring system.

Cycloaliphatic isocyanates are those which comprise at least one cycloaliphatic ring system.

Aliphatic isocyanates are those which comprise exclusively linear or branched chains, in other words acyclic compounds.

Besides the isocyanurate groups the components (a) may comprise further groups, examples being uretdione, biuret, urethane and or allophanate groups or oxadiazinetrione groups.

Preferably, however, the components (a) comprise substantially no polyisocyanate groups other than isocyanurate groups, particularly preferably less than 10% by weight, very particularly preferably less than 5% by weight.

The proportion of the isocyanurate groups in the components (a), calculated as $C_3N_3O_3$ with a molar weight of 126 g/mol, is at least 5% by weight, preferably at least 10, particularly preferably at least 15% by weight.

Particularly suitable for one preferred embodiment according to the invention are compounds (a) containing isocyanurate groups and based on isophorone diisocyanate, having an NCO content to DIN EN ISO 11909 of 16.7-17.6%, and/or an average NCO functionality of from 3.0 to 4.0, preferably from 3.0 to 3.7, particularly preferably from 3.1 to 3.5. So that coating materials based on the reaction products, according to the invention, of compounds of this kind containing isocyanurate groups are highly suitable later on for clearcoat materials, it is further advantageous if the compounds containing isocyanurate groups have a HAZEN/APHA color number to DIN EN 1557 of not more than 150.

In one preferred embodiment the compounds (a) have a total chlorine content of less than 400 mg/kg, particularly preferably a total chlorine content of less than 80 mg/kg, very particularly preferably less than 60, in particular less than 40, especially less than 20 and even less than 10 mg/kg.

Component (b) is at least one polyisocyanate which comprises isocyanurate groups, based on hexamethylene diisocyanate(1,6-diisocyanatohexane).

Polyisocyanates (b), which are different from the compounds (a), of this kind containing isocyanurate groups may in addition to hexamethylene diisocyanate comprise further aromatic, aliphatic and/or cycloaliphatic diisocyanates. Particular preference is given here to the corresponding isocyanato isocyanurates, mixed starting from hexamethylene diisocyanate with other aliphatic and/or cycloaliphatic diisocyanates, and very particular preference to the isocyanato isocyanurates based on hexamethylene diisocyanate and isophorone diisocyanate. In particular the compounds (b) are pure polyisocyanates based on hexamethylene diisocyanate, in other words tris-isocyanatohexyl isocyanurates, which constitute cyclic trimers of hexamethylene diisocyanate, or are mixtures with their higher homologs containing more than one isocyanurate ring. The isocyanato isocyanurates have in general an NCO content of from 10 to 30% by weight, in particular from 15 to 25% by weight, and an average NCO functionality of from 3 to 4.5.

Besides the isocyanurate groups the components (b) may comprise further groups, examples being uretdione, biuret, urethane or allophanate groups or oxadiazinetrione groups.

Preferably, however, the components (b) comprise substantially no polyisocyanate groups other than isocyanurate groups, particularly preferably less than 10% by weight, very particularly preferably less than 5% by weight.

The proportion of the isocyanurate groups in the components (b), calculated as $C_3N_3O_3$ with a molar weight of 126 g/mol, is at least 5% by weight, preferably at least 10, particularly preferably at least 15, very particularly preferably at least 20 and in particular at least 24% by weight.

Particularly suitable for this embodiment according to the invention are compounds containing isocyanurate groups and based on hexamethylenediamine having an NCO content to DIN EN ISO 11909 of 21.5-22.5%, a viscosity determined in the absence of solvent at 23° C. to DIN EN ISO 3219/A.3 of 2500-4000 mPas and/or an average NCO functionality of from 3.0 to 4.0, preferably from 3.0 to 3.7, particularly preferably from 3.1 to 3.5. So that coating materials based on the reaction products, according to the invention, of compounds of this kind containing isocyanurate groups are highly suitable later on for clearcoat materials, it is further advantageous if the compounds containing isocyanurate groups have a HAZEN/APHA color number to DIN EN 1557 of not more than 40.

In one preferred embodiment the compounds (b) have a total chlorine content of less than 400 mg/kg.

Synthesis component (c) is at least one aliphatic and/or cycloaliphatic diisocyanate.

Examples thereof are linear or branched $C_4$-$C_{20}$-alkylene diisocyanates or cycloaliphatic diisocyanates having a total of 6 to 20 carbon atoms.

The content of isocyanate groups, calculated as NCO=42 g/mol, is as a rule from 5 to 25% by weight.

The polyisocyanates are preferably based on one or more diisocyanates having 4 to 20 carbon atoms. Examples of conventional diisocyanates are aliphatic diisocyanates, such as tetramethylene diisocyanate, hexamethylene diisocyanate (1,6-diisocyanato-hexane), octamethylene diisocyanate, decamethylene diisocyanate, dodecamethylene diisocyanate, tetradecamethylene diisocyanate, derivatives of lysine diisocyanate, tetramethylxylylene diisocyanate, trimethylhexane diisocyanate or tetramethylhexane diisocyanate, and examples of cycloaliphatic diisocyanates are 1,4-, 1,3- or 1,2-diiso-cyanatocyclohexane, 4,4'- or 2,4'-di(isocyanatocyclohexyl)methane, 1-isocyanato-3,3,5-trimethyl-5-(isocyanatomethylcyclohexane)(isophorone diisocyanate), 1,3- or 1,4-bis(isocyanatomethyl)cyclohexane or 2,4- or 2,6-diisocyanato-1-methyl-cyclohexane.

Mixtures of the diisocyanates mentioned may also be present.

Hexamethylene diisocyanate, 1,3-bis(isocyanatomethyl) cyclohexane, isophorone diisocyanate and di(isocyanatocyclohexyl)methane are preferred, hexamethylene diisocyanate and isophorone diisocyanate are particularly preferred, and isophorone diisocyanate is very particularly preferred.

Component (d1) is at least one polyetherdiol and/or polyesterdiol having a molar weight of from 500 to 2000.

Examples of polyetherdiols are polyethylene glycol, polypropylene glycol, poly-1,3-propanediol and poly THF, preferably poly THF.

The water content of the poly THF used should be <10 000 ppm, preferably less than 5000 ppm, more preferably <1000 ppm and very particularly preferably <500 ppm.

Examples of polyesterdiols are known, for example, from Ullmanns Encyklopädie der technischen Chemie, 4th Edition, Volume 19, pages 62 to 65. Polyesterpolyols which are obtained by reacting dihydric alcohols with dibasic carboxylic acids are preferably used. Instead of the free polycarboxylic acids, it is also possible to use the corresponding polycarboxylic anhydrides or corresponding polycarboxylic esters of lower alcohols or mixtures thereof for the preparation of the polyesterpolyols. The polycarboxylic acids may be aliphatic, cycloaliphatic, araliphatic, aromatic or heterocyclic and may be optionally substituted, for example by halogen atoms, and/or unsaturated. The following may be mentioned as examples of these:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, the isomers and hydrogenation products thereof and esterifiable derivatives, such as anhydrides or dialkyl esters, for example $C_1$-$C_4$-alkyl esters, preferably methyl, ethyl or n-butyl esters, of said acids. Dicarboxylic acids of the general formula HOOC—$(CH_2)_y$—COOH, where y is a number from 1 to 20, preferably an even number from 2 to 20, are preferred, particularly preferably succinic acid, adipic acid, sebacic acid and dodecanedicarboxylic acid.

Suitable polyhydric alcohols for the preparation of the polyesterols are 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyethylene glycol having a molar mass of from 106 to 2000, polypropylene glycol having a molar weight of from 134 to 2000, poly-THF having a molar weight of from 162 to 2000, poly-1,3-propanediol having a molar weight of from 134 to 400, neopentylglycol, neopentylglycol hydroxypivalate, 2-ethyl-1,3-propanediol, 2-methyl-1,3-propanediol, 2,2-bis(4-hydroxycyclohexyl)-propane, 1,1-, 1,2-, 1,3- and 1,4-cyclohexanedimethanol, 1,2-, 1,3- or 1,4-cyclohexane-diol, trimethylolbutane, trimethylolpropane, trimethylolethane, neopentylglycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which, if appropriate, may be alkoxylated as described above.

Alcohols of the general formula HO—$(CH_2)_x$—OH, where x is a number from 1 to 20, preferably an even number from 2 to 20, are preferred. Ethylene glycol, butane-1,4-diol, hexane-1,6-diol, octane-1,8-diol and dodecane-1,12-diol are preferred. Neopentylglycol is furthermore preferred.

Lactone-based polyesterdiols are also suitable, these being homo- or copolymers of lactones, preferably those adducts of lactones with suitable difunctional initiator molecules which have terminal hydroxyl groups. Preferred lactones are those which are derived from compounds of the general formula HO—$(CH_2)_z$—COOH, where z is a number from 1 to 20 and a hydrogen atom of a methylene unit may also be substituted by a $C_1$- to $C_4$-alkyl radical. Examples are ε-caprolactone, β-propiolactone, gamma-butyrolactone and/or methyl-ε-caprolactone, 4-hydroxybenzoic acid, 6-hydroxy-2-naphthalenic acid or pivalolactone and mixtures thereof. Suitable initiator components are, for example, the low molecular weight dihydric alcohols mentioned above as a synthesis component for the polyesterpolyols. The corresponding polymers of ε-capro-lactone are particularly preferred. Lower polyesterdiols or polyetherdiols can also be used as initiators for the preparation of the lactone polymers. Instead of the polymers of lactones, it is also possible to use the corresponding, chemically equivalent polycondensates of the hydroxycarboxylic acids corresponding to the lactones.

The polyesterdiols (d1) for use in accordance with the invention have on average 2 hydroxyl functions. The use of the abovementioned acids or alcohols having a functionality of more than two may make sense in order to prepare branched polyesterdiols. The OH number of the polyesterdiols (d1) ranges as a rule from 60 to 250 mg KOH/g.

The molar mass of the polyetherdiol and polyesterdiol is at least 500, preferably at least 700, particularly preferably at least 800 and very particularly preferably at least 900 g/mol. The molar mass can be up to 2000 g/mol, preferably up to 1500, particularly preferably up to 1200 and very particularly preferably up to 1100.

Optionally it is possible to use a diol (d2) having a molar mass <220 g/mol, examples being ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentylglycol, neopentylglycol hydroxypivalate, 1,2-, 1,3- or 1,4-butanediol, 1,6-hexanediol, 1,10-decanediol, bis(4-hydroxycyclohexane)isopropylidene, tetra-methylcyclobutanediol, 1,2-, 1,3- or 1,4-cyclohexanediol, cyclooctanediol, norbornane-diol, pinanediol, decalindiol, 2-ethyl-1,3-hexanediol, 2,4-diethyloctane-1,3-diol, 2,2-bis(4-hydroxycyclohexyl)propane, 1,1-, 1,2-, 1,3- and 1,4-cyclohexanedimethanol, 1,2-, 1,3- or 1,4-cyclohexanediol, preferably ethylene glycol, 1,2-propylene glycol, 1,4-butanediol, 1,6-hexanediol, 1,4-cyclohexanedimethanol, 1,8-octanediol, 1,9-nonanediol, 1,10-decanediol or 1,12-dodecanediol.

The compounds (d1) and also the optional compound (d2) are referred to below collectively as compound (d).

Synthesis component (e) is at least one compound having at least one group reactive toward isocyanate and at least one unsaturated group capable of free radical polymerization.

Components (e) can have from one to three, preferably one or two and particularly preferably exactly one group reactive toward isocyanate.

Components (e) can have at least one unsaturated group capable of free radical polymerization, preferably from one to five, particularly preferably from one to four and very particularly preferably from one to three unsaturated groups capable of free radical polymerization.

The components (e) preferably have a molar weight of less than 10 000 g/mol, particularly preferably less than 5000 g/mol, very particularly preferably less than 4000 g/mol and in particular less than 3000 g/mol. Specific compounds (e) have a molar weight of less than 1000 or even less than 600 g/mol.

Groups reactive toward isocyanate may be, for example, —OH, —SH, —$NH_2$ and —$NHR^1$, preferably —OH, —$NH_2$ and —$NHR^1$, particularly preferably —OH and —$NH_2$, and very particularly preferably —OH, where $R^1$ is hydrogen or an alkyl group comprising 1 to 4 carbon atoms, such as, for example, methyl, ethyl, n-propyl, isopropyl, n-butyl, isobutyl, sec-butyl or tert-butyl.

Components (e) may be, for example, monoesters of α,β-unsaturated carboxylic acids, such as acrylic acid, methacrylic acid, crotonic acid, itaconic acid, fumaric acid, maleic acid, acrylamidoglycolic acid or methacrylamidoglycolic acid, or vinyl ethers with di- or polyols, which preferably have 2 to 20 carbon atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,2-, 1,3- or 1,4-butane-diol, 1,5-pentanediol, neopentylglycol, 1,6-hexanediol, 2-methyl-1,5-pentanediol, 2-ethyl-1,4-butanediol, 1,4-dimethylolcyclohexane, 2,2-bis(4-hydroxycyclohexyl)-propane, glycerol, trimethylolethane, trimethylolpropane, trimethylolbutane, pentaerythritol, ditrimethylolpropane, erythritol, sorbitol. Furthermore, esters or amides of (meth)acrylic acid with amino alcohols, e.g. 2-aminoethanol, 2-(methylamino)-ethanol, 3-amino-1-propanol, 1-amino-2-propanol or 2-(2-aminoethoxy)ethanol, 2-mercaptoethanol or polyaminoalkanes, such as ethylenediamine or diethylene-triamine, or vinylacetic acid may also be used.

Examples of amides of ethylenically unsaturated carboxylic acids with aminoalcohols are hydroxyalkyl(meth)acrylamides, such as N-hydroxymethylacrylamide, N-hydroxymethylmethacrylamide, N-hydroxyethylacrylamide, N-hydroxyethylmethacrylamide, 5-hydroxy-3-oxapentyl (meth)acrylamide, N-hydroxyalkylcrotonamides, such as N-hydroxymethylcrotonamide, or N-hydroxyalkylmaleimides, such as N-hydroxy-ethylmaleimide.

2-Hydroxyethyl(meth)acrylate, 2- or 3-hydroxypropyl (meth)acrylate, 1,4-butanediol mono(meth)acrylate, neopentylglycol mono(meth)acrylate, 1,5-pentanediol mono(meth) acrylate, 1,6-hexanediol mono(meth)acrylate, glyceryl mono- and di(meth)acrylate, trimethylolpropane mono- and di(meth)acrylate, pentaerythrityl mono-, di- and tri(meth) acrylate, and 4-hydroxybutyl vinyl ether, 2-aminoethyl (meth)acrylate, 2-aminopropyl(meth)acrylate, 3-aminopropyl(meth)acrylate, 4-aminobutyl(meth)acrylate, 6-aminohexyl(meth)acrylate, 2-thioethyl(meth)acrylate, 2-aminoethyl(meth)acrylamide, 2-aminopropyl(meth)acrylamide, 3-aminopropyl-(meth)acrylamide, 2-hydroxyethyl (meth)acrylamide, 2-hydroxypropyl(meth)acrylamide or 3-hydroxypropyl(meth)acrylamide are preferably used. 2-Hydroxyethyl acrylate, 2-hydroxyethyl methacrylate, 2- or 3-hydroxypropyl acrylate, 1,4-butanediol monoacrylate, 3-(acryloyloxy)-2-hydroxypropyl(meth)acrylate and the monoacrylates of polyethylene glycol having a molar mass of from 106 to 238 are particularly preferred.

Component (e) can also be an industrial mixture from the acrylation of trimethylolpropane, pentaerythritol, ditrimethylolpropane or dipentaerythritol. It is generally a mixture of completely and incompletely acrylated polyols; by way of example, compounds (e) are industrial mixtures from the acrylation of pentaerythritol, which generally have an OH number, according to DIN 53240, of from 99 to 115 mg KOH/g and predominantly comprise pentaerythrityl triacrylate and pentaerythrityl tetraacrylate, and may comprise minor amounts of pentaerythrityl diacrylate. This has the advantage that pentaerythrityl tetraacrylate is not incorporated into the polyurethane according to the invention but simultaneously acts as a reactive diluent.

Optional component (f) is at least one compound having exactly one group reactive toward isocyanate.

These are preferably monools, particularly preferably alkanols and very particularly preferably alkanols having 1 to 20, preferably 1 to 12, particularly preferably 1 to 6, very particularly preferably 1 to 4 and in particular 1 or 2 carbon atoms.

Examples of these are methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, cyclopentanol, cyclohexanol, cyclooctanol, cyclododecanol, ethylene glycol monomethyl ether, ethylene glycol monoethyl ether, diethylene glycol or 1,3-propanediol monomethyl ether; methanol, ethanol, isopropanol, n-propanol, n-butanol, tert-butanol, n-hexanol, 2-ethylhexanol, cyclopentanol, cyclohexanol and cyclododecanol are preferred, methanol, ethanol, isopropanol, n-propanol, n-butanol and tert-butanol are particularly preferred, and methanol and ethanol are very particularly preferred, especially methanol.

In a preferred embodiment, the monools may be said cycloaliphatic alcohols, preferably cyclopentanol or cyclohexanol, particularly preferably cyclohexanol.

In a further preferred embodiment, the monools may be said aliphatic alcohols having 6 to 20 carbon atoms, particularly preferably those having 8 to 20 carbon atoms, very particularly preferably those having 10 to 20 carbon atoms.

In a particularly preferred embodiment, the monools are said aliphatic alcohols, very particularly preferably those having 1 to 4 carbon atoms, in particular methanol.

Components (a), (b) and/or (c), preferably (a) and/or (b) and particularly preferably component (a) can be used preferably in a solvent or solvent mixture in order to reduce the viscosity.

Examples of such solvents are aromatic and/or (cyclo) aliphatic hydrocarbons and mixtures thereof, halogenated hydrocarbons, esters and ethers.

Preference is given to aromatic hydrocarbons, (cyclo)aliphatic hydrocarbons, alkyl alkanoates, alkoxylated alkyl alkanoates and mixtures thereof.

Mono- or polyalkylated benzenes and naphthalenes, alkyl alkanoates and alkoxylated alkyl alkanoates and mixtures thereof are particularly preferred.

Preferred aromatic hydrocarbon mixtures are those comprising predominantly aromatic $C_7$- to $C_{14}$-hydrocarbons and possibly comprising a boiling range of 110 to 300° C., particular preference being given to toluene, o-, m- or p-xylene, trimethylbenzene isomers, tetramethylbenzene isomers, ethylbenzene, cumene, tetrahydronaphthalene and mixtures comprising them.

Examples thereof are the Solvesso® grades from Exxon-Mobil Chemical, particularly Solvesso® 100 (CAS No. 64742-95-6, predominantly $C_9$ and $C_{10}$ aromatics, boiling range about 154-178° C.), 150 (boiling range about 182-207° C.) and 200 (CAS No. 64742-94-5), and also the Shellsol® grades from Shell. Hydrocarbon mixtures of paraffins, cycloparaffins and aromatics are also available commercially under the designations Kristallöl (for example Kristallöl 30, boiling range about 158-198° C. or Kristallöl 60: CAS No. 64742-82-1), white spirit (for example, likewise CAS No. 64742-82-1) or solvent naphtha (light: boiling range about 155-180° C., heavy: boiling range about 225-300° C.). The aromatics content of such hydrocarbon mixtures is as a rule more than 90% by weight, preferably more than 95, particularly preferably more than 98 and very particularly preferably more than 99% by weight. It may be useful to use hydrocarbon mixtures having a naphthalene content which has been especially reduced.

The aliphatic hydrocarbons content is as a rule less than 5, preferably less than 2.5 and particularly preferably less than 1% by weight.

Halogenated hydrocarbons are chlorobenzene and dichlorobenzene or its isomer mixtures, for example.

Examples of esters are n-butyl acetate, ethyl acetate, propyl propionate, 1-methoxy-prop-2-yl acetate and 2-methoxyethyl acetate.

Ethers are, for example, THF, dioxane and also the dimethyl, diethyl or di-n-butyl ethers of ethylene glycol, diethylene glycol, triethylene glycol, propylene glycol, dipropylene glycol or tripropylene glycol.

(Cyclo)aliphatic hydrocarbons are, for example, decalin, alkylated decalin and isomer mixtures of linear or branched alkanes and/or cycloalkanes.

Preference is given furthermore to n-butyl acetate, ethyl acetate, 1-methoxyprop-2-yl acetate, 2-methoxyethyl acetate and propyl propionate, and also mixtures thereof, particularly with the aromatic hydrocarbon mixtures indicated above.

Mixtures of this kind can be made in a volume ratio of from 5:1 to 1:5, preferably in a volume ratio of from 4:1 to 1:4, particularly preferably in a volume ratio of from 3:1 to 1:3 and very particularly preferably in a volume ratio of from 2:1 to 1:2.

Preferred examples are butyl acetate/xylene, methoxypropyl acetate/xylene 1:1, butyl acetate/solvent naphtha 100 1:1, butyl acetate/Solvesso® 100 1:2 and Kristallöl 30/Shellsol® A 3:1.

The amount of polyisocyanates in the solvent mixtures can as a rule be up to 98% by weight, based on the sum or polyisocyanate and solvent, preferably up to 95% by weight, particularly preferably up to 90% by weight, very particularly preferably up to 86% by weight and in particular up to 80% by weight.

The amount of polyisocyanates in the solvent mixtures is as a rule 50% by weight or more, based on the sum of polyisocyanate and solvent, preferably 60% by weight or more, particularly preferably 63% by weight or more and very particularly preferably 65% by weight or more.

Thus component (a) is used preferably in n-butyl acetate, n-butyl acetate/Solvesso®100 1:2 or Kristallöl 30/Shellsol® A 3:1 with an isocyanurate content of approximately 70% by weight, particularly preferably solvent-free.

Thus component (b) is used preferably without solvent, or in solution in n-butyl acetate, n-butyl acetate/Solvent Naphtha®100 1:1, Solvent Naphtha®100 or 1-methoxyprop-2-yl acetate with an isocyanurate content of approximately 50 to 90% by weight.

The polyurethanes which can be used in accordance with the invention are obtained by reacting components (a), (b), (d1), (d2) and (e) and also (c) and/or (f) with one another.

In one further preferred embodiment of the polyurethane acrylates according to the invention, in which at least one component (c) is present, the ratio of components (a):(b):(c) is preferably from 10 to 30: from 20 to 40: from 20 to 70 (based on mol of reactive isocyanate groups).

Here the molar composition (d):(e):(f) per 1 mol of reactive isocyanate groups in (a), (b) and (c) together is as a rule as follows:

(d) 5-50, preferably 5-40 and particularly preferably 10-30 mol % of groups reactive toward isocyanate, (e) 50-95, preferably 60-90 and particularly preferably 70-85 mol % of groups reactive toward isocyanate, (f) 0-10, preferably 0-5 and particularly preferably 0-3 mol % of groups reactive toward isocyanate, with the proviso that the sum of the groups reactive toward isocyanate corresponds to the number of isocyanate groups in (a), (b) and (c).

The ratio of the hydroxyl groups in the compounds (d) is composed of the compounds (d1):(d2) as follows: (d1):(d2)=50-100:0-50, preferably 60-100:0-40, particularly preferably 75-100:0-25, very particularly preferably 85-100:0-15 and in particular 100:0.

The formation of the adduct of compound containing isocyanate groups and of the compound which comprises groups reactive toward isocyanate groups is effected as a rule by mixing the components in any desired order, if appropriate at elevated temperature.

The compound which comprises groups reactive toward isocyanate groups is preferably added to the compound containing isocyanate groups, preferably in a plurality of steps.

In one embodiment of the present invention it is possible first initially to take at least one portion of compound (a) and/or (b), subsequently to add a stoichiometric excess of compound (d), to give a polyurethane containing hydroxyl groups, and thereafter to carry out reaction with, if appropriate, the remainder of compound (a) and/or (b) and also, if appropriate, compound (c) in the desired stoichiometry, to give a polyurethane which contains isocyanate groups and which then, in a final reaction step, is reacted with compound (e). Any isocyanate groups present can, if necessary, be lastly further consumed by reaction with compound (f).

In a further embodiment of the present invention it is possible first initially to take at least a portion of compound (a) and/or (b), subsequently to add a substoichiometric amount of at least a portion of compound (d), to give a polyurethane which contains isocyanate groups, and thereafter to carry out reaction with, if appropriate, the remainder of compound (a) and/or (b) and/or (d) and (e), and also, if appropriate, compound (c), in the desired stoichiometry. Any isocyanate groups present can, if necessary, be lastly further consumed by reaction with compound (f).

In one further embodiment of the present invention it is possible first initially to take at least a portion of compound (c), subsequently to add a substoichiometric amount of at least one portion of compound (d), to give a polyurethane which contains isocyanate groups and which is thereafter reacted with compounds (e), (a) and (b), and also, if appropriate, with the remainder of compound (c) and/or (d) in the desired stoichiometry. Any isocyanate groups present can, if necessary, be lastly further consumed by reaction with compound (f).

In one additional embodiment of the present invention it is possible first initially to take at least a portion of compound (c), subsequently to add a stoichiometric excess of at least the compound (d), to give a polyurethane which contains hydroxyl groups and which is thereafter reacted with compounds (a) and (b), and also, if appropriate, with the remainder of compound (c) in the desired stoichiometry to give a polyurethane which contains isocyanate groups. Lastly, reaction is carried out with compound (e) and, if appropriate, with the remainder of compound (d). Any isocyanate groups present can, if necessary, be lastly further consumed by reaction with compound (f).

As a rule, the reaction is carried out at temperatures of from 5 to 100° C., preferably from 20 to 90° C. and particularly preferably from 40 to 80° C. and in particular from 60 to 80° C.

Anhydrous conditions are preferably employed.

Anhydrous means that the water content in the reaction system is not more than 5% by weight, preferably not more than 3% by weight and particularly preferably not more than 1% by weight, very particularly preferably not more than 0.75 and in particular not more than 0.5% by weight.

The reaction is preferably carried out in the presence of at least one oxygen-containing gas, e.g. air or air/nitrogen mixtures or mixtures of oxygen or an oxygen-containing gas with a gas which is inert under the reaction conditions, which mixtures have an oxygen content of less than 15, preferably less than 12, particularly preferably less than 10, very particularly preferably less than 8 and in particular less than 6% by volume.

The reaction is preferably carried out in the presence of at least one polymerization inhibitor.

Polymerization inhibitors are, for example, those as described in WO 03/35596, and in particular therein from page 5, line 41 to page 9, line 7, the disclosure content of which is hereby expressly part of the present description.

Preferred polymerization inhibitors are phenothiazine, hydroquinone monomethyl ether, 2-tert-butyl-4-methylphenol, 6-tert-butyl-2,4-dimethylphenol, 2,6-di-tert-butyl-4-methyl-phenol, 4-hydroxy-2,2,6,6-tetramethylpiperidine-N-oxyl, 4-oxo-2,2,6,6-tetramethyl-piperidine-N-oxyl, N,N'-di-sec-butyl-p-phenylenediamine and mixtures thereof.

The reaction can also be carried out in the presence of an inert solvent, e.g. one of the abovementioned solvents, preferably acetone, isobutyl methyl ketone, toluene, xylene, butyl acetate, methoxypropyl acetate or ethoxyethyl acetate. However, the reaction is preferably carried out in the absence of a solvent.

The reaction times that are necessary may extend over a few minutes up to several hours. Within the field of polyurethane chemistry it is known how the reaction time is influenced by a multiplicity of parameters such as temperature, monomer concentration, and monomer reactivity.

To accelerate the reaction of the diisocyanates it is possible to use in addition the conventional catalysts. Suitability for this purpose is possessed in principle by all catalysts conventionally used in polyurethane chemistry.

These are, for example, organic amines, especially tertiary aliphatic, cycloaliphatic or aromatic amines, and/or organometallic compounds that are Lewis acids. Examples of suitable organometallic compounds that are Lewis acids include tin compounds, such as, for example, tin(II) salts of organic carboxylic acids, e.g. tin(II) acetate, tin(II) octoate, tin(II) ethylhexoate and tin(II) laurate, and the dialkyltin(IV) salts of organic carboxylic acids, e.g. dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. Also possible are metal complexes such as acetylacetonates of iron, of titanium, of aluminum, or zirconium, of manganese, of nickel and of cobalt. Further metal catalysts are described by Blank et al. in Progress in Organic Coatings, 1999, Vol. 35, pages 19-29.

Preferred Lewis-acidic organometallic compounds are dimethyltin diacetate, dibutyltin dibutyrate, dibutyltin bis(2-ethylhexanoate), dibutyltin dilaurate, dioctyltin dilaurate, zirconium acetylacetonate and zirconium 2,2,6,6-tetramethyl- 3,5-heptanedionate. Bismuth and cobalt catalysts as well, and also cesium salts, can be used as catalysts. Suitable cesium salts include those compounds in which the following anions are employed: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, n being the numbers from 1 to 20.

Preference here is given to cesium carboxylates in which the anion conforms to the formulae $(C_nH_{2n-1}O_2)^-$ and $(C_{n+1}H_{2n-2}O_4)^{2-}$ with n being 1 to 20. Particularly preferred cesium salts have monocarboxylate anions of the general formula $(C_nH_{2n-1}O_2)^-$, n being the numbers from 1 to 20. Deserving particular mention in this context are the formate, acetate, propionate, hexanoate and 2-ethylhexanoate.

The polyurethanes (A) according to the invention can be used in coating materials either alone or in a mixture with other compounds capable of free radical polymerization.

The present invention further relates to radiation-curable coating materials comprising
- at least one polyurethane (A) according to the invention,
- if appropriate, at least one compound (B) having one or more than one double bond capable of free radical polymerization,
- if appropriate, at least one photoinitiator (P) and
- if appropriate, further additives typical of coatings.

The polyurethanes (A) according to the invention can be used as the sole binder or in combination with a further compound capable of free radical polymerization.

Compounds having one or more than one double bond capable of free radical polymerization are, for example, those compounds which have from 1 to 6, preferably from 1 to 4 and particularly preferably from 1 to 3 groups capable of free radical polymerization.

Groups capable of free radical polymerization are, for example, vinyl ether or (meth)acrylate groups, preferably (meth)acrylate groups and particularly preferably acrylate groups.

Compounds capable of free radical polymerization are frequently divided into monofunctional (compound having one double bond capable of free radical polymerization) and polyfunctional (compound having more than one double bond capable of free radical polymerization) polymerizable compounds.

Monofunctional, polymerizable compounds are those having exactly one group capable of free radical polymerization, and polyfunctional, polymerizable compounds are those having more than one, preferably having at least two, groups capable of free radical polymerization.

Monofunctional, polymerizable compounds are, for example, esters of (meth)acrylic acid with alcohols which have 1 to 20 carbon atoms, e.g. methyl(meth)acrylate, ethyl(meth)acrylate, butyl(meth)acrylate, 2-ethylhexyl(meth)acrylate, 2-hydroxyethyl(meth)acrylate, 2-hydroxypropyl(meth)acrylate, 4-hydroxybutyl(meth)acrylate, or dihydrodicyclopentadienyl acrylate, vinylaromatic compounds, e.g. styrene or divinylbenzene, α,β-unsaturated nitriles, e.g. acrylonitrile or methacrylonitrile, α,β-unsaturated aldehydes, e.g. acrolein or methacrolein, vinyl esters, e.g. vinyl acetate or vinyl propionate, halogenated ethylenically unsaturated compounds, e.g. vinyl chloride or vinylidene chloride, conjugated unsaturated compounds, e.g. butadiene, isoprene or chloroprene, monounsaturated compounds, e.g. ethylene, propylene, 1-butene, 2-butene or isobutene, cyclic monounsaturated compounds, e.g. cyclopentene, cyclohexene or cyclododecene, N-vinylformamide, allylacetic acid, vinylacetic acid, monoethylenically unsaturated carboxylic acids having 3 to 8 carbon atoms and the water-soluble alkali metal, alkaline earth metal or ammonium salts thereof, such as, for example, acrylic acid, methacrylic acid, dimethylacrylic acid, ethacrylic acid, maleic acid, citraconic acid, methylenemalonic acid, crotonic acid, fumaric acid, mesaconic acid and itaconic acid, maleic acid, N-vinylpyrrolidone, N-vinyllactams, such as, for example, N-vinylcaprolactam, N-vinyl-N-alkylcarboxamides or N-vinylcarboxamides, such as, for example, N-vinylacetamide, N-vinyl-N-methyl-formamide and N-vinyl-N-methylacetamide, or vinyl ethers, e.g. methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether or 4-hydroxybutyl vinyl ether, and mixtures thereof.

Preferred among these are the esters of (meth)acrylic acid, particularly preferably methyl(meth)acrylate, ethyl(meth)acrylate, n-butyl(meth)acrylate, 2-ethylhexyl(meth)acrylate and 2-hydroxyethyl acrylate, very particularly preferably n-butyl(meth)acrylate, 2-ethylhexyl(meth)acrylate and 2-hydroxyethyl acrylate and in particular 2-hydroxyethyl acrylate.

In this document, (meth)acrylic acid is methacrylic acid and acrylic acid, preferably acrylic acid.

In one preferred embodiment of the present invention, reactive diluents of the kind disclosed in the German patent application DE 10346327 A1 and identified therein as compounds b) are explicitly excluded as monofunctional, polymerizable compounds. Reactive diluents of that kind are monofunctional esters of α,β-ethylenically unsaturated carboxylic acids with a monofunctional alkanol that has at least one saturated 5- or 6-membered heterocycle with one or two oxygen atoms in the ring as a structural element. Heterocycles of that kind derive for example from tetrahydrofuran, tetrahydropyran, 1,3-dioxolane or 1,3- or 1,4-dioxane.

In one particularly preferred embodiment of the present invention, acrylates and methacrylates as listed in the international patent application WO 2005/035460, p. 7, l. 2 to 17, are excluded as monofunctional, polymerizable compounds.

Polyfunctional, polymerizable compounds are preferably polyfunctional(meth)acrylates which carry more than 1, preferably 2-10, particularly preferably 2-6, very particularly preferably 2-4 and in particular 2-3(meth)acrylate groups, preferably acrylate groups.

Examples of polyfunctional, polymerizable compounds are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentylglycol diacrylate, 1,1-, 1,2-, 1,3- and 1,4-cyclohexanedimethanol diacrylate, 1,2-, 1,3- or 1,4-cyclohexanediol diacrylate, trimethylolpropane triacrylate, ditrimethylolpropane penta- or hexaacrylate, pentaerythrityl tri- or tetraacrylate, glyceryl di- or triacrylate and di- and polyacrylates of sugar alcohols, such as, for example, sorbitol, mannitol, diglycerol, threitol, erythritol, adonitol (ribitol), arabitol (lyxitol), xylitol, dulcitol (galactitol), maltitol or isomalt, or of polyesterpolyols, polyetherols, poly-THF having a molar mass of from 162 to 2000, poly-1,3-propanediol having a molar mass of from 134 to 1178, polyethylene glycol having a molar mass of from 106 to 898, and epoxy(meth)acrylates, urethane(meth)acrylates or polycarbonate(meth)acrylates.

Further examples are (meth)acrylates of compounds of the formulae (VIIIa) to (VIIIc),

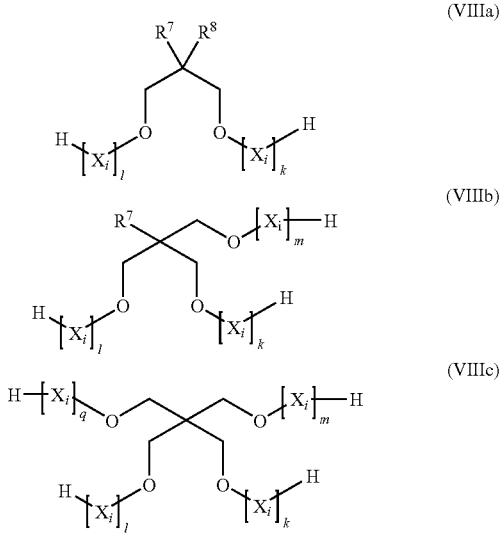

where

R[7] and R[8], independently of one another, are hydrogen or $C_1$-$C_{18}$-alkyl, optionally substituted by aryl, alkyl, aryloxy, alkoxy, hetero atoms and/or heterocycles, k, l, m and q, independently of one another, are each an integer from 1 to 10, preferably from 1 to 5 and particularly preferably from 1 to 3 and each $X_i$, if i=1 to k, 1 to l, 1 to m and 1 to q, independently of one another, may be selected from the group consisting of —$CH_2$—$CH_2$—O—, —$CH_2$—$CH(CH_3)$—O—, —CH($CH_3$)—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O— and —CHPh-$CH_2$—O—, preferably from the group consisting of —$CH_2$—$CH_2$—O—, —$CH_2$—$CH(CH_3)$—O— and —$CH(CH_3)$—$CH_2$—O—, and particularly preferably —$CH_2$—$CH_2$—O—, where Ph is phenyl and Vin is vinyl.

Therein, $C_1$-$C_{18}$-alkyl optionally substituted by aryl, alkyl, aryloxy, alkoxy, hetero atoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, preferably methyl, ethyl or n-propyl, very particularly preferably methyl or ethyl.

They are preferably (meth)acrylates of neopentylglycol, trimethylolpropane, trimethylolethane or pentaerythritol which has a degree of ethoxylation, propoxylation or mixed ethoxylation and propoxylation of from one to twenty and particularly preferably from three to ten and in particular which is exclusively ethoxylated.

Preferred polyfunctional, polymerizable compounds are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythrityl tetraacrylate, polyesterpolyol acrylates, polyetherol acrylates and the triacrylate of trimethylolpropane which has a degree of alkoxylation of from one to twenty, particularly preferably of ethoxylated trimethylolpropane.

Very particularly preferred polyfunctional, polymerizable compounds are 1,4-butanediol diacrylate, 1,6-hexanediol diacrylate, trimethylolpropane triacrylate, pentaerythrityl tetraacrylate and the triacrylate of trimethylolpropane having a degree of ethoxylation of from one to twenty.

Further constituents may also be polyalcohols which are partly or fully esterified with (meth)acrylic acid.

Polyalcohols of this kind are, for example, at least dihydric polyols, polyetherols or polyesterols or polyacrylate polyols having an average OH functionality of at least 2, preferably at least 3, particularly preferably at least 4 and very particularly preferably from 4 to 20.

Polyetherols may in addition to the alkoxylated polyols also be polyethylene glycol having a molar mass of from 106 to 2000, polypropylene glycol having a molar weight of from 134 to 2000, poly THF having a molar weight of from 162 to 2000 or poly-1,3-propanediol having a molar weight of from 134 to 400.

Polyesterpolyols are known, for example, from Ullmanns Encyklopädie der technischen Chemie, 4th Edition, Volume 19, pages 62 to 65. Polyesterpolyols which are obtained by reacting dihydric alcohols with dibasic carboxylic acids are preferably used. Instead of the free polycarboxylic acids, it is also possible to use the corresponding polycarboxylic anhydrides or corresponding polycarboxylic esters of lower alcohols or mixtures thereof for the preparation of the polyesterpolyols. The polycarboxylic acids may be aliphatic, cycloaliphatic, araliphatic, aromatic or heterocyclic and may be optionally substituted, for example by halogen atoms, and/or unsaturated. The following may be mentioned as examples of these:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, the isomers and hydrogenation products thereof and esterifiable derivatives, such as anhydrides or dialkyl esters, for example $C_1$-$C_4$-alkyl esters, preferably methyl, ethyl or n-butyl esters, of said acids. Dicarboxylic acids of the general formula HOOC—$(CH_2)_y$—COOH, where y is a number from 1 to 20, preferably an even number from 2 to 20, are preferred, particularly preferably succinic acid, adipic acid, sebacic acid and dodecanedicarboxylic acid.

Suitable polyhydric alcohols for the preparation of the polyesterols are 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, polyethylene glycol having a molar mass of from 106 to 2000, polypropylene glycol having a molar weight of from 134 to 2000, poly-THF having a molar weight of from 162 to 2000, poly-1,3-propanediol having a molar weight of from 134 to 400, neopentylglycol, neopentylglycol hydroxypivalate, 2-ethyl-1,3-propanediol, 2-methyl-1,3-propanediol, 2,2-bis(4-hydroxycyclohexyl)-propane, 1,1-, 1,2-, 1,3- and 1,4-cyclohexanedimethanol, 1,2-, 1,3- or 1,4-cyclohexane-diol, trimethylolbutane, trimethylolpropane, trimethylolethane, neopentylglycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which, if appropriate, may be alkoxylated as described above.

Alcohols of the general formula HO—(CH$_2$)$_x$—OH, where x is a number from 1 to 20, preferably an even number from 2 to 20, are preferred. Ethylene glycol, butane-1,4-diol, hexane-1,6-diol, octane-1,8-diol and dodecane-1,12-diol are preferred. Neopentylglycol is furthermore preferred.

Lactone-based polyesterdiols are also suitable, these being homo- or copolymers of lactones, preferably those adducts of lactones with suitable difunctional initiator molecules which have terminal hydroxyl groups. Preferred lactones are those which are derived from compounds of the general formula HO—(CH$_2$)$_z$—COOH, where z is a number from 1 to 20 and a hydrogen atom of a methylene unit may also be substituted by a C$_1$- to C$_4$-alkyl radical. Examples are ε-caprolactone, β-propiolactone, gamma-butyrolactone and/or methyl-ε-caprolactone, 4-hydroxybenzoic acid, 6-hydroxy-2-naphthalenic acid or pivalolactone and mixtures thereof. Suitable initiator components are, for example, the low molecular weight dihydric alcohols mentioned above as a synthesis component for the polyesterpolyols. The corresponding polymers of ε-capro-lactone are particularly preferred. Lower polyesterdiols or polyetherdiols can also be used as initiators for the preparation of the lactone polymers. Instead of the polymers of lactones, it is also possible to use the corresponding, chemically equivalent polycondensates of the hydroxycarboxylic acids corresponding to the lactones.

Polycarbonate-diols, as may be obtained, for example, by reacting phosgene with an excess of the lower molecular weight alcohols mentioned as synthesis components for the polyesterpolyols, are, furthermore, also suitable.

Furthermore, the polyfunctional, polymerizable compound may be a urethane(meth)acrylate, epoxy(meth)acrylate or carbonate(meth)acrylate.

Urethane(meth)acrylates are obtainable, for example, by reacting polyisocyanates with hydroxyalkyl(meth)acrylates or hydroxyalkyl vinyl ethers and, if appropriate, chain extenders, such as diols, polyols, diamines, polyamines or dithiols or polythiols. Urethane(meth)acrylates dispersible in water without addition of emulsifiers additionally comprise ionic and/or nonionic hydrophilic groups which, for example, are introduced into the urethane by synthesis components such as hydroxycarboxylic acids.

Such urethane(meth)acrylates are different from the polyurethane acrylates (A) according to the invention and substantially comprise as synthesis components:
(1) at least one organic aliphatic, aromatic or cycloaliphatic di- or polyisocyanate,
(2) at least one compound having at least one group reactive toward isocyanate and at least one unsaturated group capable of free radical polymerization and
(3) if appropriate, at least one compound having at least two groups reactive toward isocyanate.

The urethane(meth)acrylates preferably have a number average molar weight M$_n$ of from 500 to 20 000, in particular from 500 to 10 000, particularly preferably from 600 to 3000, g/mol (determined by gel permeation chromatography using tetrahydrofuran and polystyrene as a standard).

The urethane(meth)acrylates preferably have a content of from 1 to 5, particularly preferably from 2 to 4, mol of (meth)acrylate groups per 1000 g of urethane(meth)acrylate.

Epoxide(meth)acrylates are obtainable by reacting epoxides with (meth)acrylic acid. Suitable epoxides are, for example, epoxidized olefins, aromatic glycidyl ethers or aliphatic glycidyl ethers, preferably those of aromatic or aliphatic glycidyl ethers.

Epoxidized olefins may be, for example, ethylene oxide, propylene oxide, isobutylene oxide, 1-butene oxide, 2-butene oxide, vinyloxirane, styrene oxide or epichlorohydrin, preferably ethylene oxide, propylene oxide, isobutylene oxide, vinyloxirane, styrene oxide or epichlorohydrin, particularly preferably ethylene oxide, propylene oxide or epichlorohydrin and very particularly preferably ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g. 2,5-bis[(2,3-epoxypropoxy)phenyl]octahydro-4,7-methano-5H-indene (CAS No. [13446-85-0]), tris[4-(2,3-epoxypropoxy)phenyl]methane isomers (CAS No. [66072-39-7]), phenol-based epoxy novolaks (CAS No. [9003-35-4]) and cresol-based epoxy novolaks (CAS No. [37382-79-9]).

Aliphatic glycidyl ethers are, for example, 1,4-butanediol diglycidyl ether, 1,6-hexanediol diglycidyl ether, trimethylolpropane triglycidyl ether, pentaerythrityl tetraglycidyl ether, 1,1,2,2-tetrakis[4-(2,3-epoxypropoxy)phenyl]ethane (CAS No. [27043-37-4]), diglycidyl ether of polypropylene glycol (α,β-bis(2,3-epoxypropoxy)-poly(oxypropylene) (CAS No. [16096-30-3]) and of hydrogenated bisphenol A (2,2-bis-[4-(2,3-epoxypropoxy)cyclohexyl[propane (CAS No. [13410-58-7]).

The epoxide(meth)acrylates and epoxide vinyl ethers preferably have a number average molar weight M$_n$ of from 200 to 20 000, particularly preferably from 200 to 10 000, g/mol and very particularly preferably from 250 to 3000 g/mol; the content of (meth)acryloyl or vinyl ether groups is preferably from 1 to 5, particularly preferably from 2 to 4, per 1000 g of epoxide(meth)acrylate or vinyl ether epoxide (determined by gel permeation chromatography using polystyrene as a standard and tetrahydrofuran as an eluent).

Carbonate(meth)acrylates comprise on average preferably from 1 to 5, in particular from 2 to 4, particularly preferably 2 or 3, (meth)acryloyl groups and very particularly preferably 2 (meth)acryloyl groups.

The number average molecular weight M$_n$ of the carbonate (meth)acrylates is preferably less than 3000 g/mol, particularly preferably less than 1500 g/mol, particularly preferably less than 800 g/mol (determined by gel permeation chromatography using polystyrene as a standard and tetrahydrofuran as a solvent).

The carbonate(meth)acrylates are obtainable in a simple manner by transesterification of carbonic esters with polyhydric, preferably dihydric, alcohols (diols, e.g. hexanediol) and then esterifying the free OH groups with (meth)acrylic acid or by transesterification with (meth)acrylic esters, as described, for example, in EP-A 92 269. They are also obtainable by reacting phosgene or urea derivatives with polyhydric, e.g. dihydric, alcohols.

Vinyl ether carbonates are also obtainable in an analogous manner by reacting a hydroxyalkyl vinyl ether with carbonic esters and, if appropriate, dihydric alcohols.

(Meth)acrylates or vinyl ethers of polycarbonate polyols, such as the reaction product of one of said di- or polyols and a carbonic ester and a (meth)acrylate or vinyl ether containing hydroxyl groups, are also conceivable.

Suitable carbonic esters are, for example, ethylene carbonate, 1,2- or 1,3-propylene carbonate or dimethyl, diethyl or dibutyl carbonate.

Suitable (meth)acrylates containing hydroxyl groups are, for example, 2-hydroxyethyl(meth)acrylate, 2- or 3-hydroxypropyl(meth)acrylate, 1,4-butanediol mono(meth)acrylate, neopentylglycol mono(meth)acrylate, glyceryl mono- and di(meth)acrylate, trimethylolpropane mono- and di(meth) acrylate and pentaerythrityl mono-, di- and tri(meth)acrylate.

Suitable vinyl ethers containing hydroxyl groups are, for example, 2-hydroxyethyl vinyl ether and 4-hydroxybutyl vinyl ether.

Particularly preferred carbonate(meth)acrylates are those of the formula

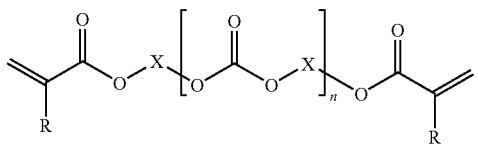

where R is H or CH$_3$, X is a C$_2$-C$_{18}$-alkylene group and n is an integer from 1 to 5, preferably from 1 to 3.

R is preferably H and X is preferably C$_2$- to C$_{10}$-alkylene, for example 1,2-ethylene, 1,2-propylene, 1,3-propylene, 1,4-butylene or 1,6-hexylene, particularly preferably C$_4$- to C$_8$-alkylene. Very particularly preferably, X is C$_6$-alkylene.

The carbonate(meth)acrylates are preferably aliphatic carbonate(meth)acrylates.

Among the polyfunctional, polymerizable compounds, urethane(meth)acrylates are particularly preferred.

For UV radiation curing it is necessary to add UV photoinitiator to the coating materials according to the invention. In the case of curing by means of electron beams it is possible to dispense with the addition of photoinitiator.

Photoinitiators may be, for example, photoinitiators known to a person skilled in the art, for example those mentioned in "Advances in Polymer Science", Volume 14, Springer Berlin 1974, or in K. K. Dietliker, Chemistry and Technology of UV- and EB-Formulation for Coatings, Inks and Paints, Volume 3; Photoinitiators for Free Radical and Cationic Polymerization, P. K. T. Oldring (Eds), SITA Technology Ltd, London.

For example, mono- or bisacylphosphine oxides, as described, for example, in EP-A 7 508, EP-A 57 474, DE-A 196 18 720, EP-A 495 751 or EP-A 615 980, are suitable, for example 2,4,6-trimethylbenzoyidiphenylphosphine oxide (Lucirin® TPO from BASF AG), ethyl-2,4,6-trimethylbenzoylphenylphosphinate (Lucirin® TPO L from BASF AG), bis(2,4,6-trimethylbenzoyl)phenylphosphine oxide (Irgacure□ 819 from Ciba Spezialitätenchemie), benzophenones, hydroxyacetophenones, phenylglyoxylic acid and its derivatives or mixtures of these photoinitiators. Benzophenone, aceto-phenone, acetonaphthoquinone, methyl ethyl ketone, valerophenone, hexanophenone, α-phenylbutyrophenone, p-morpholinopropiophenone, dibenzosuberone, 4-morpholino-benzophenone, 4-morpholinodeoxybenzoin, p-diacetylbenzene, 4-aminobenzo-phenone, 4'-methoxyacetophenone, β-methylanthraquinone, tert-butylanthraquinone, anthraquinonecarboxylic acid esters, benzaldehyde, α-tetralone, 9-acetyl-phenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropyl-thioxanthaone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracen-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraq uinones, such as 2-methylanthraquinone, 2-ethylanthraquinone, 2-tert-butylanthraquinone, 1-chloro-anthraquinone, 2-amylanthraquinone and 2,3-butanedione may be mentioned as examples.

Nonyellowing or low-yellowing photoinitiators of the phenylglyoxalic acid ester type, as described in DE-A 198 26 712, DE-A 199 13 353 or WO 98/33761, are also suitable.

Preferred among these photoinitiators are 2,4,6-trimethylbenzoyldiphenylphosphine oxide, ethyl-2,4,6-trimethylbenzoylphenylphosphinate, bis(2,4,6-trimethylbenzoyl)-phenylphosphine oxide, benzophenone, 1-benzoylcyclohexan-1-ol, 2-hydroxy-2,2-dimethylacetophenone and 2,2-dimethoxy-2-phenylacetophenone.

For example, antioxidants, stabilizers, activators (accelerators), fillers, pigments, dyes, antistatic agents, flameproofing agents, thickeners, thixotropic agents, surface-active agents, viscosity modifiers, plasticizers or chelating agents may be used as further additives typical of coatings.

It is furthermore possible to add one or more thermally activatable initiators, e.g. potassium peroxodisulfate, dibenzoyl peroxide, cyclohexanone peroxide, di-tert-butyl peroxide, azobisisobutyronitile, cyclohexylsulfonyl acetyl peroxide, diisopropyl percarbonate, tert-butyl peroctoate or benzpinacol, and, for example, those thermally activatable initiators which have a half-life of more than 100 hours at 80° C., such as di-tert-butyl peroxide, cumyl hydroperoxide, dicumyl peroxide, tert-butyl perbenzoate, silylated pinacols, which are commercially available, for example, under the trade name ADDID 600 from Wacker, or amine N-oxides containing hydroxyl groups, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", 2nd Edition, Wiley & Sons, New York.

Suitable thickeners in addition to (co)polymers capable of free radical (co)polymerization are conventional organic and inorganic thickeners, such as hydroxymethylcellulose or bentonite.

Chelating agents which may be used are, for example, ethylenediamineacetic acid and salts thereof and also β-diketones.

Suitable fillers comprise silicates, for example silicates obtainable by hydrolysis of silicon tetrachloride, such as Aerosil® from Degussa, silica, talc, aluminum silicates, magnesium silicates, calcium carbonates, etc.

Suitable stabilizers comprise typical UV absorbers, such as oxanilides, triazines and benzotriazole (the latter obtainable as Tinuvin® grades from Ciba-Spezialitätenchemie) and benzophenones. These can be used alone or together with suitable free radical scavengers, for example sterically hindered amines, such as 2,2,6,6-tetramethyl-piperidine, 2,6-di-tert-butylpiperidine or derivatives thereof, e.g. bis(2,2,6,6-tetramethyl-4-piperidyl) sebacinate. Stabilizers are usually used in amounts of from 0.1 to 5.0% by weight, based on the solid components which the formulation comprises.

The coating of the substrates with the coating materials according to the invention is effected by conventional methods known to a person skilled in the art, a coating material according to the invention or a coating formulation comprising said coating material being applied in the desired thickness to the substrate to be coated and, if appropriate, being dried. This operation can, if desired, be repeated once or several times. The application to the substrate can be effected in a known manner, for example by spraying, filling, knife-coating, brushing, applying with a hard or rubber-coated roller, pouring, laminating, injection backmolding or coextrusion. The application of the coating material can also be effected electrostatically in the form of powder (powder coatings). The coating thickness is as a rule in a range from about 3 to 1000 g/m² and preferably from 10 to 200 g/m².

Furthermore, a process for the coating of substrates is disclosed, in which, if appropriate, further additives typical of coatings and heat-curable, chemically curable or radiation-curable resins are added to a coating material according to the invention or to a coating formulation comprising such material, said coating material or said formulation is applied to the substrate and, if appropriate, dried, and cured by means of electron beams or exposure to UV light under an oxygen-containing atmosphere or preferably under inert gas.

In addition to radiation curing, further curing mechanisms may also be involved, for example heat curing, moisture curing, chemical curing and/or oxidative curing.

The coating material can be applied one or more times by a very wide range of spraying methods, such as, for example, compressed-air, airless or electrostatic spraying methods using one- or two-component spray units, but also by spraying, filling, knife-coating, brushing, application with a hard or rubber-coated roller, pouring, lamination, injection backmolding or coextrusion.

The coating thickness is as a rule in a range from about 3 to 1000 g/m² and preferably from 10 to 200 g/m².

The drying and curing of the coatings is effected in general under normal temperature conditions, i.e. without heating of the coating. However, the mixtures according to the invention can also be used for the production of coatings which, after application, are dried at elevated temperature, for example at 40-250° C., preferably 40-150° C. and in particular at from 40 to 100° C. and cured. This is limited by the thermal stability of the substrate.

Furthermore, a process for coating substrates is disclosed in which, if appropriate, heat-curable resins are added to the coating material according to the invention or to coating formulations comprising said coating material, and said coating material or said formulation is applied to the substrate, dried, and then cured by means of electron beams or exposure to UV light under an oxygen-containing atmosphere or preferably under inert gas, if appropriate at temperatures up to the level of the drying temperature.

The process for coating substrates can also be carried out in such a way that, after application of the coating material or coating formulations according to the invention, first exposure to electron beams or UV light under oxygen or preferably under inert gas is effected in order to achieve preliminary curing, thermal treatment is then effected at temperatures up to 160° C., preferably from 60 to 160° C., and then final curing by means of electron beams or exposure to UV light under oxygen or preferably under inert gas is effected.

If appropriate, if a plurality of layers of the coating material are applied one on top of the other, drying and/or radiation curing can be effected after each coating operation.

The radiation curing is effected using high-energy light, e.g. UV light or electron beams. The radiation curing can be effected at relatively high temperatures. A temperature above the $T_g$ of the radiation-curable binder is preferred.

Suitable radiation sources for the radiation curing are, for example, low-pressure mercury lamps, medium-pressure mercury lamps with high-pressure lamps and fluorescent tubes, pulsed lamps, metal halide lamps, electronic flash means, with the result that radiation curing is possible without a photoinitiator, or excimer lamps. The radiation curing is effected by the action of high-energy radiation, i.e. UV radiation or daylight, preferably light in the wavelength range of $\lambda$=200 to 700 nm, particularly preferably of $\lambda$=200 to 500 nm and very particularly preferably $\lambda$=250 to 400 nm, or by exposure to high-energy electrons (electron beams; from 150 to 300 keV). Radiation sources used are, for example, high-pressure mercury vapor lamps, lasers, pulsed lamps (flashlight), halogen lamps or excimer lamps. The radiation dose usually sufficient for the crosslinking in the case of UV curing is in the range from 80 to 3000 mJ/cm².

It constitutes an advantage of the present invention that the coating materials according to the invention exhibit a high reactivity under irradiation with UV A radiation, by which for the purposes of this document is meant electromagnetic radiation with a wavelength of from 400 to 320 nm. This has the advantage that irradiation with UV A radiation is subject to lower impositions under workplace protection law than operations with shorter-wave radiation, since, for example, less ozone is generated.

Of course, a plurality of radiation sources may also be used for the curing, for example from two to four.

These can also emit in respectively different wavelength ranges.

The drying and/or thermal treatment can also be effected in addition to or instead of the thermal treatment by NIR radiation, NIR radiation being defined here as electromagnetic radiation in the wavelength range from 760 nm to 2.5 μm, preferably from 900 to 1500 nm.

The irradiation can, if appropriate, also be carried out in the absence of oxygen, for example under an inert gas atmosphere. Suitable inert gases are preferably nitrogen, noble gases, carbon dioxide or combustion gases. Furthermore, the irradiation may be effected by covering the coating material with transparent media. Transparent media are, for example, plastics films, glass or liquids, e.g. water. Irradiation in the manner described in DE-A1 199 57 900 is particularly preferred.

The polyurethanes according to the invention can be used for coating a variety of substrates, such as, for example, wood, wood veneer, paper, board, cardboard, textile, leather, nonwovens, plastics surfaces, glass, ceramic, mineral building materials, uncoated metals or coated metals.

In the case of the use in coating compositions the polyurethanes according to the invention can be employed in particular in primers, surfacers, pigmented topcoat materials and, in particular, clearcoat materials in the area of automotive refinish or the painting of large-size vehicles, in the latter case especially as refinish coating materials. Coating compositions of this kind are particularly suitable for applications calling for particularly high application reliability, outdoor weathering stability, optical qualities, solvent resistance, chemical resistance and water resistance, such as in automotive refinish and the painting of large-size vehicles.

The polyurethanes and coating materials according to the invention are distinguished by a high level of hardness and scratch resistance in conjunction with high elasticity.

ppm and percentage data used in this document relate to percentages by weight, ppm by weight and parts by weight, unless stated otherwise.

The examples which follow are intended to illustrate the invention but not to restrict it to these examples.

EXAMPLES

Example 1

A stirred reactor was charged with 202 parts of poly THF having an average molecular weight of 1000 g/mol, 105 parts of propyl propionate, 0.64 part of 2,6-di-tert-butyl-4-methylphenol, 0.3 part of methyl hydroquinone, 107 parts of isophorone diisocyanate (IPDI), and 107 parts of IPDI isocyanurate (Vestanat® 1890 from Degussa AG) and this initial charge was stirred at room temperature until a homogeneous mixture had formed. Then 0.13 part of dibutyltin dilaurate was added and the batch was stirred at 70° C. for an hour. Thereafter 171 parts of hydroxyethyl acrylate and 1.3 parts of butanediol were added. When the temperature had dropped again to 70° C., 107 parts of Basonat® HI 100 (isocyanurate of hexamethylene diisocyanate, BASF AG) and 105 parts of propyl propionate were added and reaction was continued at 70° C. for a further 4 hours. When the NCO values had dropped to <0.2%, 5 parts of methanol were added and reaction was continued at 70° C. for a further 4 hours. The urethane acrylate had a viscosity, measured in a cone/plate viscometer at 23° C., of 2.6 Pas.

Example 2

In a stirred reactor, 567 parts of poly THF having an average molecular weight of 1000 g/mol, 300 parts of isophorone diisocyanate, 60 parts of butyl acetate, and 300 parts of IPDI trimer (Vestanat® 1890 from Degussa AG) were admixed with 0.4 part of dibutyltin dilaurate and the batch was left to react at 70° C. for 1 hour. Then 1.8 parts of 2,6-di-tert-butyl-4-methylphenol, 0.9 part of methyl hydroquinone, 480 parts of hydroxyethyl acrylate and 300 parts of Basonat® HI 100 (isocyanurate of hexamethylene diisocyanate, BASF AG) were added and reaction was continued at 70° C. for a further 4 hours. When the NCO values had dropped to <0.6%, 15 parts of methanol were added and reaction was continued at 70° C. for a further 4 hours. The urethane acrylate had a viscosity at 23° C. of 350 Pas in a cone/plate viscometer.

Example 3

In a stirred reactor, 567 parts of polycaprolactone having an average molecular weight of 1000 g/mol, 300 parts of isophorone diisocyanate, 330 parts of butyl acetate, and 300 parts of IPDI trimer (Vestanat® 1890 from Degussa AG) were admixed with 0.4 part of dibutyltin dilaurate and the batch was left to react at 70° C. for 1 hour. Then 1.8 parts of 2,6-di-tert-butyl-4-methylphenol, 0.9 part of methyl hydroquinone, 480 parts of hydroxyethyl acrylate and 300 parts of Basonat® HI 100 (isocyanurate of hexamethylene diisocyanate, BASF AG) were added and reaction was continued at 70° C. for a further 4 hours. When the NCO values had dropped to <0.4%, 15 parts of methanol were added and reaction was continued at 70° C. for a further 4 hours.

Performance testing of the coating materials 97 parts of the urethane acrylate obtained according to example 2 were diluted with butyl acetate to a viscosity of 1000 mPas, admixed with 2.5 parts of the photoinitiator 1-hydroxycyclohexyl phenyl ketone and with 0.5 part of bis(2,4,6-trimethylbenzoyl)-phenylphosphine oxide and drawn down using a 200 µm doctor blade onto glass plates and onto Bonder metal panels, dried at room temperature for 30 minutes and 60° C. for 30 minutes and then exposed for 4 minutes to a Panacol UV-A lamp F-450 (iron-doped, transparent filterglass).

The coats had an Erichsen cupping of 6.8 mm (DIN 53156, high values indicate high flexibility) and a pendulum hardness of 66 s (DIN 53157, high values indicate high hardness). The loss of gloss after 10 double rubs in a Scotch Brite Test with an applied weight of 750 g was 16% (high scratch resistance).

Comparative Example 1

A round-bottomed flask was charged with 450 parts of polytetrahydrofuran ($M_n$=1000 g/mol), 105 parts of hydroxyethyl acrylate, 250 parts of trimethylolpropane formal monoacrylate, 0.4 part of hydroquinone monomethyl ether and 0.1 part of dibutyltin laurate and this initial charge was heated to 80° C. Then 200 parts of isophorone diisocyanate were added dropwise over the course of half an hour. Reaction was continued for a further 5 hours until the isocyanate group content of the mixture (NCO value) had dropped to 0. The resulting resin was filtered through a 50 µm filter and discharged.

A coating comprising a urethane acrylate of comparative example 1 rather than the urethane acrylate from example 2 showed an Erichsen cupping of >9.5 mm but was still tacky (pendulum damping 9 s).

Comparative Example 2

A coating comprising a urethane acrylate as per example 1 of EP 903363 rather than the urethane acrylate from example 2 showed an Erichsen cupping of 4 mm, a pendulum damping of 122 s and a loss of gloss of 93% (very low scratch resistance).

In the Scotch Brite test, as the test body, a fiber web modified with silicon carbide and measuring 3×3 cm (Scotch Brite SUFN, from 3M) is affixed to a cylinder. This cylinder presses the fiber web against the coating at 750 g and is moved over the coating pneumatically. The path length of the deflection amounts to 7 cm. After 10 double rubs (DR) the gloss is measured in the middle area of the exposure (eightfold determination) in a method based on DIN 67530 with an incident angle of 20°. The residual gloss value in percent is given by the ratio of gloss after exposure to initial gloss. High residual gloss values, i.e. low values for the loss of gloss, indicate high scratch resistance.

The invention claimed is:
1. A polyurethane acrylate (A), comprising: as synthesis components
 (a) at least one polyisocyanate which comprises isocyanurate groups, based on 1-isocyanato-3,3,5-trimethyl-5-(isocyanatomethyl)cyclohexane,
 (b) at least one polyisocyanate which comprises isocyanurate groups, based on hexamethylene diisocyanate,
 (c) at least one aliphatic and/or cycloaliphatic diisocyanate,
 (d1) at least one polyetherdiol or polyesterdiol having a molecular weight of from 500 to 2000,
 (d2) optionally, at least one diol having a molecular weight of less than 220 g/mol,
 e) at least one compound having at least one group reactive toward isocyanate and at least one unsaturated group capable of free radical polymerization, and
 f) optionally, at least one compound having exactly one group reactive toward isocyanate.

2. The polyurethane acrylate according to claim 1, wherein compound (a) is a polyisocyanate containing isocyanurate groups and synthesized exclusively from isophorone diisocyanate.

3. The polyurethane acrylate according to claim 2, wherein compound (a) is a polyisocyanate containing isocyanurate groups, synthesized exclusively from isophorone diisocyanate, and having a HAZEN/APHA color number to DIN EN 1557 of not more than 150.

4. The polyurethane acrylate according to claim 1, wherein compound (b) is a polyisocyanate containing isocyanurate groups and is synthesized exclusively from hexamethylene diisocyanate.

5. The polyurethane acrylate according to claim 4, wherein compound (b) is a polyisocyanate containing isocyanurate groups, synthesized exclusively from hexamethylene diisocyanate, and having an NCO content to DIN EN ISO 11909 of 21.5 -22.5 % and a viscosity determined in the absence of solvent at 23° C. to DIN EN ISO 3219/A.3 of 2500-4000 mPas.

6. The polyurethane acrylate according to claim 4, wherein compound (b) is a polyisocyanate containing isocyanurate groups, synthesized exclusively from hexamethylene diisocyanate, and having a HAZEN/APHA color number to DIN EN 1557 of not more than 40.

7. The polyurethane acrylate according to claim 1, wherein compound (c) is hexamethylene diisocyanate or isophorone diisocyanate.

8. The polyurethane acrylate according to claim 1, wherein compound (d1) is polyethylene glycol, polypropylene glycol, poly-1,3-propanediol or poly THF.

9. The polyurethane acrylate according to claim 1, wherein compound (d2) is ethylene glycol, 1,2-propylene glycol, 1,4-butanediol, 1,6-hexanediol, 1,4-cyclohexanedimethanol, 1,8-octanediol, 1,9-nonanediol, 1,10-decanediol or 1,12-dodecanediol.

10. The polyurethane acrylate according to claim 1, wherein compound (e) is 2-hydroxyethyl (meth)acrylate, 2- or 3-hydroxypropyl (meth)acrylate, 1,4-butanediol mono (meth)acrylate, neopentylglycol mono(meth)acrylate, 1,5-pentanediol mono(meth)acrylate, 1,6-hexanediol mono (meth)acrylate, glyceryl mono- and di(meth)acrylate, trimethylolpropane mono- and di(meth)acrylate, pentaerythrityl mono-, di- and tri(meth)acrylate, 4-hydroxybutyl vinyl ether, 2-aminoethyl (meth)acrylate, 2-aminopropyl (meth) acrylate, 3 -aminopropyl (meth)acrylate, 4-aminobutyl (meth)acrylate, 6-aminohexyl (meth)acrylate, 2-thioethyl (meth)acrylate, 2-aminoethyl(meth)acrylamide, 2-aminopropyl(meth)acrylamide, 3-aminopropyl(meth)acrylamide, 2-hydroxyethyl(meth)-acrylamide, 2-hydroxypropyl(meth) acrylamide or 3-hydroxypropyl(meth)acrylamide.

11. A process for preparing a polyurethane acrylate according to claim 1, which comprises:
  initially taking at least a portion of compound (a) and/or (b), subsequently adding a stoichiometric excess of compound (d), thereafter reacting the mixture with, optionally, the remainder of compound (a) and/or (b) and also, optionally, compound (c) in the desired stoichiometry, and then conducting reaction with compound (e).

12. A process for preparing a polyurethane acrylate according to claim 1, which comprises initially taking at least a portion of compound (a) and/or (b), subsequently adding a substoichiometric amount of at least one portion of compound (d) and thereafter conducting reaction with, optionally, the remainder of compound (a) and/or (b) and/or (d) and (e), and also, optionally, compound (c), in the desired stoichiometry.

13. A process for preparing a polyurethane acrylate according to claim 1, which comprises:
  initially taking at least a portion of compound (c), subsequently adding a substoichiometric amount of at least a portion of compound (d), and thereafter conducting reaction with the compounds (e), (a) and (b), and also, optionally, the remainder of compound (c) and/or (d), in the desired stoichiometry.

14. A radiation-curable coating material composition, comprising:
  at least one polyurethane acrylate (A) according to claim 1,
  optionally, at least one compound (B) having one or more than one double bond capable of free radical polymerization,
  optionally, at least one photoinitiator (P) and
  optionally, further additives typical of coatings.

15. A method of coating a surface, comprising:
  applying the polyurethane acrylate (A) according to claim 1, or a coating composition containing the polyurethane acrylate (A) onto a surface of wood, wood veneer, paper, board, cardboard, textile, leather, nonwovens, plastics, glass, ceramic, mineral building materials, uncoated metals or coated metals.

16. The method of preparing coating products, comprising:
  incorporating the polyurethane acrylate (A) of claim 1 or a composition containing the polyurethane acrylate (A) of claim 1 as a component of primers, surfacers, pigmented topcoat materials, clearcoat materials, clearcoat materials in the area of automotive refinishing or the painting of large-size vehicles, or as a refinishing material.

* * * * *